(12) United States Patent
Fujiwara

(10) Patent No.: US 8,790,019 B2
(45) Date of Patent: Jul. 29, 2014

(54) ROLLING BEARING

(71) Applicant: JTEKT Corporation, Osaka (JP)

(72) Inventor: Hideki Fujiwara, Kitakatsuragi-gun (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/893,736

(22) Filed: May 14, 2013

(65) Prior Publication Data

US 2013/0308891 A1 Nov. 21, 2013

(30) Foreign Application Priority Data

May 16, 2012 (JP) .................................. 2012-112674

(51) Int. Cl.
*F16C 33/50* (2006.01)
*F16C 19/36* (2006.01)
*F16C 33/51* (2006.01)
*F16C 33/46* (2006.01)

(52) U.S. Cl.
CPC ............. *F16C 33/50* (2013.01); *F16C 2360/31* (2013.01); *F16C 2300/14* (2013.01); *F16C 19/364* (2013.01); *F16C 33/513* (2013.01); *F16C 33/4605* (2013.01)
USPC ............ 384/572; 384/577; 384/580; 384/623

(58) Field of Classification Search
USPC ......... 384/523, 572, 576–577, 580, 614, 621, 384/623
See application file for complete search history.

(56) References Cited

U.S. PATENT DOCUMENTS

| | | | | |
|---|---|---|---|---|
| 3,847,456 A | * | 11/1974 | Schwarzbich | 384/623 |
| 4,523,862 A | * | 6/1985 | Yasui et al. | 384/572 |
| 4,541,744 A | * | 9/1985 | Lederman | 384/614 |
| 4,822,183 A | * | 4/1989 | Lederman | 384/523 |
| 4,932,796 A | * | 6/1990 | Schurger et al. | 384/607 |
| 5,810,484 A | * | 9/1998 | Bustamante et al. | 384/609 |
| 6,843,604 B2 | * | 1/2005 | Hiramatsu | 384/523 |
| 2008/0193070 A1 | * | 8/2008 | Beluffi et al. | 384/523 |
| 2009/0208161 A1 | * | 8/2009 | Jauernig et al. | 384/572 |
| 2010/0074569 A1 | * | 3/2010 | Matsushita | 384/571 |
| 2010/0209036 A1 | * | 8/2010 | Ueno | 384/571 |
| 2010/0215298 A1 | * | 8/2010 | Zeidlhack | 384/51 |
| 2011/0103730 A1 | * | 5/2011 | Oya et al. | 384/572 |

FOREIGN PATENT DOCUMENTS

| | | | | |
|---|---|---|---|---|
| DE | 3115779 A1 | * | 11/1982 | F16C 33/51 |
| EP | 2065604 A1 | * | 6/2009 | F16C 19/36 |
| GB | 1281670 A | * | 7/1972 | F16C 19/46 |
| GB | 1470062 A | * | 4/1977 | |
| JP | A-2003-120680 | | 4/2003 | |
| JP | 2007285415 A | * | 11/2007 | |
| JP | 2007285507 A | * | 11/2007 | |
| WO | WO 2006094661 A1 | * | 9/2006 | F16C 19/34 |

* cited by examiner

*Primary Examiner* — Marcus Charles
(74) *Attorney, Agent, or Firm* — Oliff PLC

(57) ABSTRACT

A cage used in a large-size rolling bearing is formed of a plurality of cage segments having a circular-arc shape and arranged in a circular pattern. Each cage segment includes rims opposed to each other and separated from each other at a predetermined interval, and a plurality of cage bars that extend from one of the rims to the other rim and that define pockets which accommodate the rollers and which are arranged in the circumferential direction. Multiple pairs of hook portions, between which the inner ring is sandwiched, are formed so as to project from the rims, and are arranged at predetermined intervals in the circumferential direction. Distal ends of the hook portions are engaged with annular grooves formed in end portions of the inner ring so as be rotatable relative to the inner ring.

2 Claims, 3 Drawing Sheets

ROLLING BEARING

INCORPORATION BY REFERENCE

The disclosure of Japanese Patent Application No. 2012-112674 filed on May 16, 2012 including the specification, drawings and abstract is incorporated herein by reference in its entirety.

BACKGROUND OF THE INVENTION

1. Field of the Invention

The invention relates generally to a rolling bearing, and more specifically to a large-size rolling bearing by which, for example, a main shaft of a wind power generation system is rotatably supported.

2. Description of Related Art

There is a conventional cage used in a large-size rolling bearing, and assembled in an annular shape by connecting together a plurality of split pieces arranged along the circumferential direction. For example, Japanese Patent Application Publication 2003-120680 (JP 2003-120680 A) describes a cage of a rolling bearing, which is formed of strip-shaped split pieces that hold rolling elements. A convex connection portion is formed at one longitudinal end of each split piece so as to project from the one end. In addition, a concave connection portion, which is shaped so as to conform to the convex connection portion, is formed at the other longitudinal end of each split piece. The cage is formed by arranging the strip-shaped split pieces along the circumferential direction and engaging the convex portions of the split pieces with the concave portions thereof. Note that, in the following description, "split piece" will be referred to as "cage segment".

As described above, JP 2003-120680 A describes the configuration that allows the multiple strip-shaped cage segments to be engaged with each other along the circumferential direction. However, in the cage described in JP 2003-120680 A, because the concave connection portions extend through the cage segments in the radial direction, it is not possible to effectively prevent junctions of the cage segments from being displaced inward and outward in the radial direction. Therefore, when the cage segments are arranged in a circular pattern along the outer peripheral face of an inner ring, the cage segments may be easily detached from the inner ring. Further, when the rolling elements are fitted in pockets in a state where the cage segments are arranged in a circular pattern, the cage segments may be easily detached from the inner ring together with the rolling elements. Therefore, works of arranging the cage segments in a circular pattern and fitting the rolling elements in the pockets are difficult. As a result, a large number of man-hours are required to assemble the rolling bearing.

SUMMARY OF THE INVENTION

One object of the invention is to provide a rolling bearing configured such that cage segments and rolling elements are prevented from being detached from an inner ring during assembly to reduce the number of man-hours required to assemble the rolling bearing.

An aspect of the invention relates to a rolling bearing, including: an inner ring; an outer ring arranged so as to be concentric with the inner ring; a plurality of rolling elements disposed between the inner ring and the outer ring; and an annular cage that holds the rolling elements. The cage is formed of a plurality of cage segments each having a circular-arc shape and arranged in a circular pattern. Each of the cage segments includes: a pair of a first rim and a second rim opposed to each other and separated from each other at a predetermined interval, and a plurality of cage bars extending from the first rim to the second rim, and defining pockets that accommodate the rolling elements and that are arranged in a circumferential direction. Multiple pairs of hook portions, between which the inner ring is sandwiched, are formed so as to project from the first rim and the second rim, and are arranged at predetermined intervals in the circumferential direction. Distal ends of the hook portions are engaged with annular grooves formed in end portions of the inner ring so as be rotatable relative to the inner ring.

BRIEF DESCRIPTION OF THE DRAWINGS

The foregoing and further features, advantages of the invention will become apparent from the following description of example embodiments with reference to the accompanying drawings, wherein like numerals are used to denote like elements, and wherein.

DETAILED DESCRIPTION OF EMBODIMENTS

Figure 1:
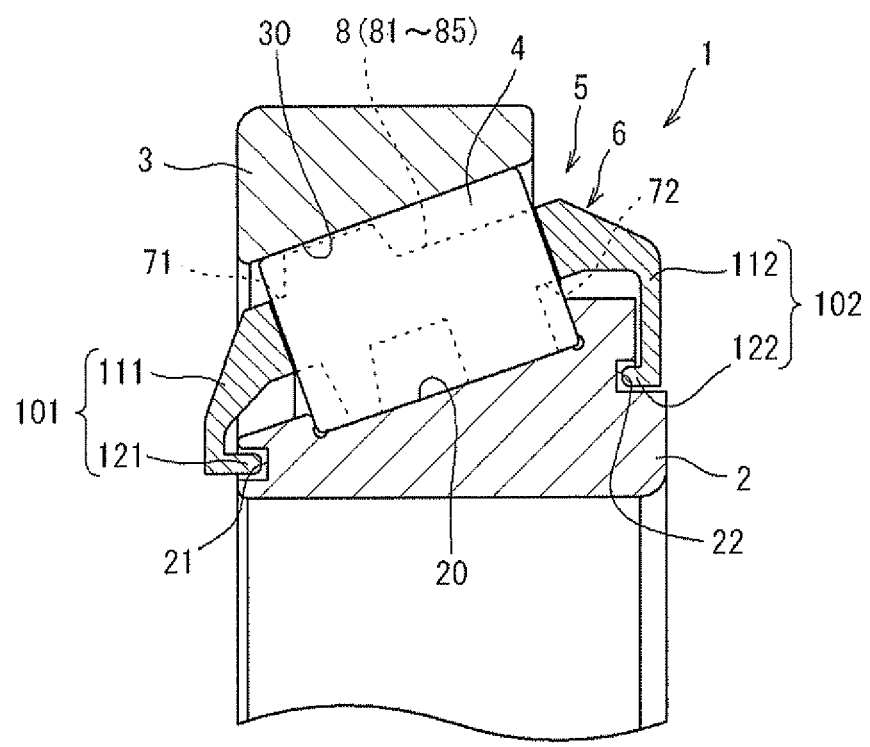
FIG. 1 is a sectional view illustrating main portions of a rolling bearing according to an embodiment of the invention.

Hereinafter, an embodiment of the invention will be described in detail with reference to the accompanying drawings. FIG. 1 is a sectional view illustrating main portions of a rolling bearing 1 according to the embodiment of the invention. As shown in FIG. 1, the rolling bearing 1 according to the embodiment is a large-size rolling bearing by which a main shaft of a wind power generation system is rotatably supported. The rolling bearing 1 includes an inner ring 2, an outer ring 3, a plurality of tapered rollers 4, and a cage 5 that holds the tapered rollers 4. Therefore, the rolling bearing 1 is a tapered roller bearing.

The inner ring 2 and the outer ring 3 are each formed in an annular shape, and made of, for example, through hardened steel, or carburized steel as bearing material. The inner ring 2 has, at its outer periphery, an inner ring raceway 20 which extends in the circumferential direction and on which the tapered rollers 4 roll. The outer ring 3 is concentric with the inner ring 2, and has, at its inner periphery, an outer ring raceway 30 which extends in the circumferential direction, which faces the inner ring raceway 20, and on which the tapered rollers 4 roll.

The tapered rollers 4 are arranged between the inner ring 2 and the outer ring 3. The tapered rollers 4 are rollable on the inner ring raceway 20 and the outer ring race way 30, and thus, the inner ring 2 and the outer ring 3 are rotatable relative to each other. The cage 5 is an annular member that is concentric with the inner ring 2 and the outer ring 3. The cage 5 is made of, for example, synthetic resin such as polyether-ether-ketone (PEEK) resin reinforced with carbon fibers. The cage 5 holds the tapered rollers 4 between the inner ring 2 and the outer ring 3. Note that, the cage 5 may be made of polyamide resin.

Figure 2:
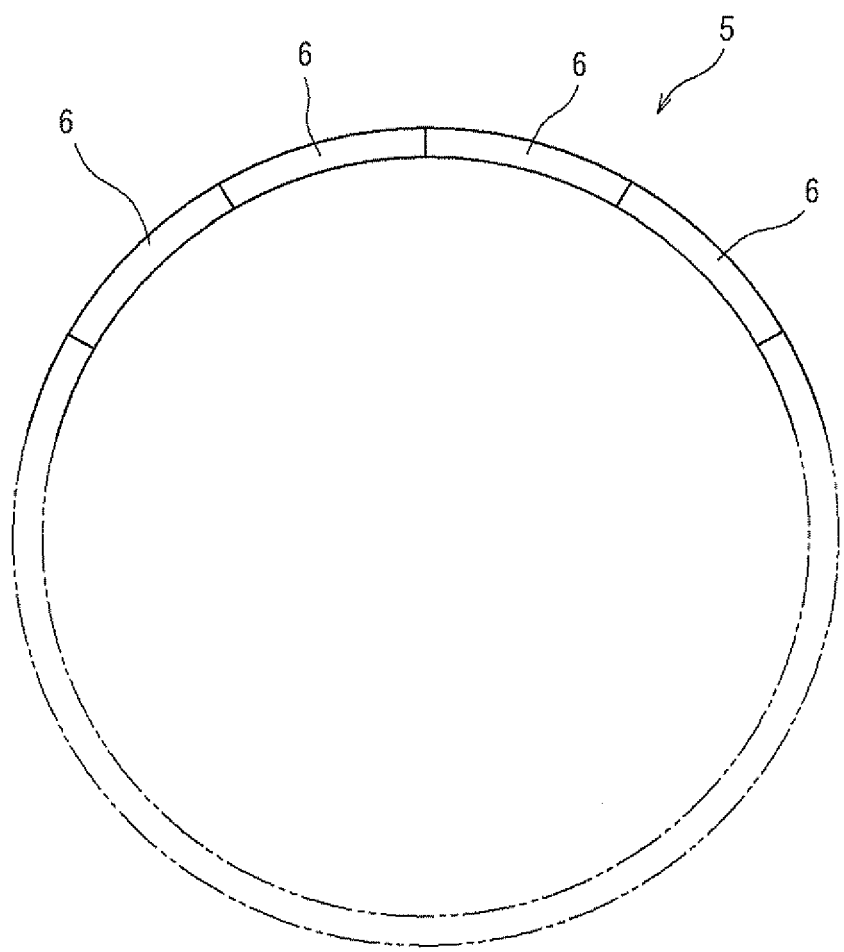
FIG. 2 is a schematic front view illustrating a cage of the rolling bearing.
Figure 3:
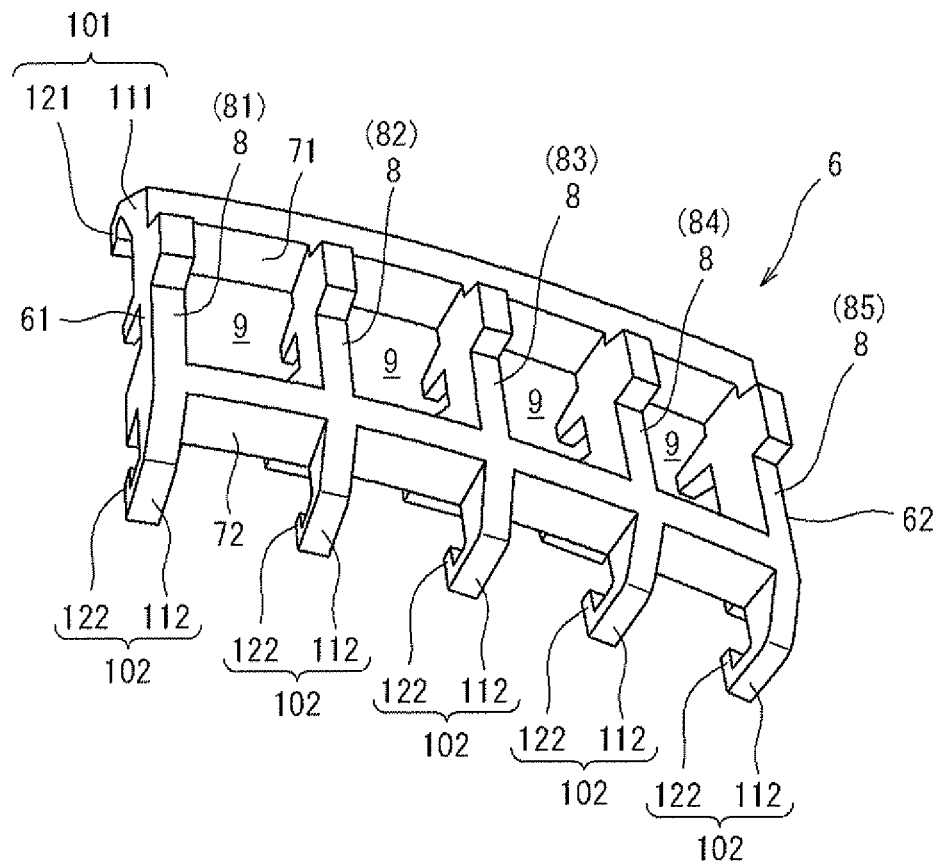
FIG. 3 is a perspective view illustrating one of cage segments that constitute the cage.

FIG. 2 is a schematic front view illustrating the cage 5 of the rolling bearing 1. As shown in FIG. 2, the cage 5 is formed of a plurality of cage segments 6 arranged in the circumferential direction. FIG. 3 is a perspective view illustrating the configuration of one of the cage segments 6 of the cage 5. As shown in FIG. 3, each cage segment 6 is in a circular-arc shape concentric with the inner ring 2 and the outer ring 3. The cage segment 6 has a first rim 71, a second rim 72, and a plurality of cage bars 8. The first rim 71 and the second rim 72 are arranged in pair, face each other, and are separated from each other by a predetermined interval. The cage bars 8 extend from the first rim 71 to the second rim 72. In the cage segment 6, pockets 9 that accommodate the tapered rollers 4 are formed of spaces each of which is defined by the two cage bars 8 adjacent to each other, the first rim 71, and the second rim 72. The cage segment 6 is a single-piece molded part made of the above-described synthetic resin.

The cage bars 8 are five cage bars, that is, a first cage bar 81, a second cage bar 82, a third cage bar 83, a fourth cage bar 84 and a fifth cage bar 85 that are arranged in this order at equal intervals from one end side 61 to the other end side 62 (from the left end side to the right end side in FIG. 3) of the cage segment 6.

The first rim 71 and the second rim 72 extend over a range from the first cage bar 81 to the fifth cage bar 85. As shown in FIG. 1 and FIG. 3, multiple pairs of right and left hook portions 102, 101 are formed on the side faces of the second and first rims 72, 71 so as to project from the side faces thereof, respectively. The inner ring 2 is sandwiched between the hook portions 101, 102. The pairs of hook portions 101, 102 are arranged at predetermined intervals in the circumferential direction. The hook portion 101 and the hook portion 102 in each pair are arranged at the same position in the circumferential direction.

The hook portion 101 and the hook portion 102 have a hook body 111 and a hook body 112, and an engagement lug 121 and an engagement lug 122, respectively. The hook bodies 111, 112 in each pair extend inward in the radial direction of the rolling bearing 1, and are opposed to each other with the inner ring 2 interposed therebetween. The engagement lugs 121, 122 in each pair extend from the distal ends of the hook bodies 111, 112 in the axial direction of the rolling bearing 1, and are opposed to each other with the inner ring 2 interposed therebetween. The inner ring 2 has, at respective axial end faces, annular engagement grooves 21, 22. The engagement lugs 121, 122 of the hook portions 101, 102, which are arranged in pairs with the inner ring 2 interposed therebetween, are engaged with the engagement grooves 21, 22, respectively, so as to be rotatable relative to the inner ring 2 about the axis of the inner ring 2.

The rolling bearing 1 is assembled as follows. First, the engagement lugs 121, 122 of the hook portions 101, 102 of the cage segments 6 are engaged with the annular engagement grooves 21, 22 formed in the respective axial end faces of the inner ring 2 so as to be rotatable relative to the inner ring 2 about the axis of the inner ring 2, and then the tapered rollers 4 are inserted into the cage segments 6 from the radially outer side to be fitted in the pockets 9. Thus, an inner ring assembly is obtained. After that, the outer ring 3 is fitted onto the outer periphery of the inner ring assembly. In this way, the assembly of the rolling bearing 1 is completed. During the assembly, it is possible to prevent the cage 5 from being detached from the inner ring 2 together with the tapered rollers 4 because the cage segments 6 are engaged with the inner ring 2. As a result, the assembly of the rolling bearing 1 is facilitated, and consequently, the number of man-hours required to assemble the rolling bearing 1 is reduced.

Further, because the hook bodies 111, 112 and the engagement lugs 121, 122 are rotatable relative to the inner ring 2, the inner ring 2 and the cage 5 are allowed to rotate relative to each other without using a support member by which the inner ring 2 and the cage 5 are supported so as to be rotatable relative to each other, during the use of the rolling bearing 1. Therefore, the rolling bearing 1 is suitable particularly as a large-size rolling bearing by which the main shaft of the wind power generation system is rotatably supported. Note that, the invention is not limited to the above-described embodiment. For example, in the above-described embodiment, the invention is applied to the cage segment 6 of the following type. The tapered rollers 4 are inserted into the cage segment 6 from the radially outer side, and fitted in the pockets 9. However, the cage segment to which the invention is applied is not limited to the cage segment 6. The invention may be also applied to a cage segment of the following type. Tapered rollers are fitted in pockets of each cage segment from the radially inner side in advance, and then the cage segments are arranged along an inner ring. In the above-described embodiment, the hook bodies 111, 112 and the engagement lugs 121, 122 engaged in the engagement grooves 21, 22 are provided on the respective sides of each of the cage bars 81 to 85 with the inner ring 2 interposed therebetween. However, the invention is limited to this example. For example, the hook portions 101 and the hook portions 102 may be provided on the respective sides of every other cage bar among the cage bar 81 on one end side to the cage bar 85 on the other end side, and accordingly, no hook portions 101, 102 may be provided on the respective sides of some of the cage bars 81 to 85.

Further, in the above-described embodiment, the invention is applied to the tapered roller bearing. However, the invention is limited to this example. The invention may be applied to a ball bearing or a cylindrical roller bearing. Even in these examples, the object of the invention is achieved at a sufficient level. Moreover, in the above-described embodiment, the invention is applied to the rolling bearing for the main shaft of the wind power generation system, the main shaft having a large outer diameter. However, the invention may be applied not only to the rolling bearing for the wind power generation system but also to rolling bearings such as a slewing rim bearing.

In addition, various design changes or modifications may, of course, be made within the technical scope of the invention stated in the appended claim. That is, the embodiment described in this specification is merely one example, and accordingly, the invention is not limited to the above-described embodiment. The technical scope of the invention is limited only by the appended claim in view of the contents described in this specification, and therefore, includes all modifications in the meanings equivalent to the expression stated in the claim and all modifications within the scope of the claim.

According to the invention, the rolling elements are inserted in the cage segments in the radial direction and fitted in the pockets after the distal ends of the hook portions of the cage segments are engaged with the engagement grooves of the inner ring. Therefore, it is possible to prevent the cage segments from being detached from the inner ring when the cage segments are arranged in a circular pattern along the outer periphery of the inner ring. Further, even when the rolling elements are inserted into the pockets in a state where the cage segments are arranged in a circular pattern, the cage segments are not easily detached from the inner ring together with the rolling elements. As a result, the cage segments and the rolling elements are prevented from being detached from the inner ring during the assembly of the rolling bearing.

What is claimed is:
1. A rolling bearing, comprising:
an inner ring comprising a pair of axial end portions and having annular grooves formed in the pair of axial end portions;

an outer ring arranged so as to be concentric with the inner ring;

a plurality of rolling elements disposed between the inner ring and the outer ring; and an annular cage that holds the rolling elements, wherein the annular cage is formed of a plurality of cage segments each having a circular-arc shape and that is arranged in a circular pattern, each of the plurality of cage segments includes:

a pair of a first rim and a second rim opposed to each other and separated from each other at a predetermined interval; and a plurality of cage bars extending from the first rim to the second rim, and defining pockets that accommodate the rolling elements and that are arranged in a circumferential direction;

multiple pairs of hook portions, between which the inner ring is sandwiched, are formed so as to project from the first rim and the second rim, and are arranged at predetermined intervals in the circumferential direction; and distal ends of the hook portions, wherein engagement lugs extending inwardly in the axial direction from the distal ends of the hook portions engage axially with the annular grooves formed in the pair of axial end portions of the inner ring so as be rotatable relative to the inner ring.

2. A rolling bearing, comprising:

an inner ring comprising two axial end portions and having an annular groove formed in each of the two axial end portions of the inner ring;

an outer ring arranged so as to be concentric with the inner ring;

a plurality of rolling elements disposed between the inner ring and the outer ring; and an annular cage that holds the rolling elements, wherein the annular cage is formed of a plurality of cage segments each having a circular-arc shape and that is arranged in a circular pattern, each of the plurality of cage segments includes:

a pair of a first rim and a second rim opposed to each other and separated from each other at a predetermined interval; and a plurality of cage bars extending from the first rim to the second rim, and defining pockets that accommodate the rolling elements and that are arranged in a circumferential direction;

multiple pairs of hook portions, wherein each pair of hook portions comprises a left hook and a right hook that are opposing and formed on the side faces of the first rim and the second rim, between which the inner ring is sandwiched, are formed so as to project from the first rim and the second rim, and are arranged at predetermined intervals in the circumferential direction, and distal ends of each of the hook portions, wherein engagement lugs extending inwardly in the axial direction of the rolling bearing from the distal ends of the hook portions engage axially with the annular grooves formed in each of the two axial end portions of the inner ring, wherein the engagement lugs are rotatable relative to the inner ring.

\* \* \* \* \*